(12) United States Patent  (10) Patent No.: US 8,925,172 B2
English  (45) Date of Patent: Jan. 6, 2015

(54) MOUNTING FIXTURE AND METHOD FOR USING SAME

(71) Applicant: Douglas A. English, Loomis, CA (US)

(72) Inventor: Douglas A. English, Loomis, CA (US)

(*) Notice: Subject to any disclaimer, the term of this patent is extended or adjusted under 35 U.S.C. 154(b) by 0 days.

(21) Appl. No.: 14/173,766

(22) Filed: Feb. 5, 2014

(65) Prior Publication Data

US 2014/0225486 A1   Aug. 14, 2014

Related U.S. Application Data

(60) Provisional application No. 61/760,804, filed on Feb. 5, 2013.

(51) Int. Cl.
*A47B 13/00* (2006.01)
*F16B 13/04* (2006.01)

(52) U.S. Cl.
CPC .............. *A47B 13/00* (2013.01); *F16B 13/04* (2013.01)
USPC ............... 29/428; 108/158.11; 312/140.4; 411/33; 411/344

(58) Field of Classification Search
CPC ............................... A47B 13/00; F16B 13/04
USPC ............ 411/340, 33, 75–80, 24, 25, 32, 344; 312/140.3, 140.4; 108/158.11; 29/428
See application file for complete search history.

(56) References Cited

U.S. PATENT DOCUMENTS

| | | | | | |
|---|---|---|---|---|---|
| 2,374,740 | A | * | 5/1945 | Gadow | 411/359 |
| 2,632,354 | A | * | 3/1953 | Black | 411/368 |
| 3,343,441 | A | * | 9/1967 | Van Buren, Jr. | 411/37 |
| 3,534,650 | A | * | 10/1970 | Kubokawa | 411/344 |
| 4,293,259 | A | * | 10/1981 | Liebig | 411/32 |
| 4,690,597 | A | * | 9/1987 | Liebig | 411/32 |
| 4,809,477 | A | * | 3/1989 | Gasser | 411/344 |
| 4,883,398 | A | * | 11/1989 | Duncan | 411/344 |
| 5,336,049 | A | * | 8/1994 | Herman | 312/236 |
| 5,417,531 | A | * | 5/1995 | Brown | 411/344 |
| 5,525,013 | A | * | 6/1996 | Seegmiller et al. | 405/259.3 |
| 5,549,431 | A | * | 8/1996 | Royle | 411/389 |
| 5,803,671 | A | * | 9/1998 | Gray | 411/385 |
| 5,944,466 | A | * | 8/1999 | Rudnicki et al. | 411/344 |
| 6,485,118 | B2 | * | 11/2002 | Matus, Jr. | 312/137 |
| 7,001,126 | B2 | * | 2/2006 | Lesecq | 411/340 |

(Continued)

FOREIGN PATENT DOCUMENTS

DE    4432658 A1 *  3/1996
DE    94 22 153 U1 *  8/1998

(Continued)

*Primary Examiner* — Gay Ann Spahn
(74) *Attorney, Agent, or Firm* — Catherine Ashley Straight (57) ABSTRACT

A fixture for mounting on a support structure having an outer surface and an inner surface defining a thickness, with a bore therethrough, comprising: a tubular body, having a top section and a bottom externally threaded section; a retaining collar, having an upper portion, the bottom surface thereof larger than the bore, and a circular internally threaded lower portion smaller than the bore; a keeper body, having an internally threaded circular passageway, including a ring shaped upper part having an outside surface and an outside diameter slightly smaller than the diameter of the bore, and a lower part having a smaller diameter than said upper part, the retaining collar and keeper body sized for threading onto the tubular body; and pivotable, rotatable ears having an upper edge and a lower end providing a stop, mounted to the upper part of the keeper body.

20 Claims, 7 Drawing Sheets

(56) References Cited

U.S. PATENT DOCUMENTS

| | | | |
|---|---|---|---|
| 7,040,723 B2 * | 5/2006 | Matus, Jr. | 312/140.4 |
| 7,226,261 B1 * | 6/2007 | Bristol | 411/342 |
| 8,109,579 B2 * | 2/2012 | English et al. | 312/137 |
| 8,166,583 B1 * | 5/2012 | Liang | 4/610 |
| 8,257,004 B2 * | 9/2012 | Smith | 411/265 |
| 8,403,430 B2 * | 3/2013 | Atkins | 312/137 |
| 8,585,160 B2 * | 11/2013 | Atkins | 312/137 |
| 8,708,629 B2 * | 4/2014 | Smith | 411/267 |
| 2002/0043906 A1 * | 4/2002 | Dewitt et al. | 312/137 |
| 2002/0096976 A1 * | 7/2002 | Matus, Jr. | 312/137 |
| 2003/0145437 A1 * | 8/2003 | Medgyes | 24/290 |
| 2004/0047710 A1 * | 3/2004 | Lauchner | 411/340 |
| 2004/0208721 A1 * | 10/2004 | Kuenzel | 411/340 |
| 2004/0208722 A1 * | 10/2004 | Kuenzel | 411/340 |
| 2006/0163976 A1 * | 7/2006 | Matus, Jr. | 312/140.4 |
| 2006/0175940 A1 * | 8/2006 | English | 312/137 |
| 2006/0192467 A1 * | 8/2006 | Matus, Jr. | 312/140.4 |
| 2006/0193712 A1 * | 8/2006 | Kuna et al. | 411/340 |
| 2007/0236112 A1 * | 10/2007 | Williman | 312/140.4 |
| 2007/0286702 A1 * | 12/2007 | Smith | 411/432 |
| 2008/0080949 A1 * | 4/2008 | Deng et al. | 411/342 |
| 2009/0103999 A1 * | 4/2009 | Fucito | 411/342 |
| 2010/0122445 A1 * | 5/2010 | Cossart | 29/281.6 |
| 2011/0169384 A1 * | 7/2011 | Padden et al. | 312/140.4 |
| 2011/0182697 A1 * | 7/2011 | Smith | 411/433 |
| 2012/0134764 A1 * | 5/2012 | Smith | 411/267 |
| 2013/0031771 A1 * | 2/2013 | Henneberry | 29/525.02 |
| 2014/0178146 A1 * | 6/2014 | Ma | 411/80 |
| 2014/0219742 A1 * | 8/2014 | Smith | 411/328 |

FOREIGN PATENT DOCUMENTS

| | | | |
|---|---|---|---|
| EP | 0133037 A1 * | 2/1985 | |
| EP | 0746657 B1 * | 3/2000 | |
| GB | 2 144 194 A * | 2/1985 | |
| WO | WO 93/10316 A1 * | 5/1993 | |
| WO | WO 97/00383 A1 * | 1/1997 | |
| WO | WO 99/17031 A1 * | 4/1999 | |

* cited by examiner

MOUNTING FIXTURE AND METHOD FOR USING SAME

PRIORITY CLAIM

Pursuant to the provisions of 35 U.S.C. §119(e)(1), Applicant claims the priority of U.S. Provisional Patent Application Ser. No. 61/760,804, filed Feb. 5, 2013.

BACKGROUND OF THE INVENTION

1. Field of the Invention

The invention relates generally to a fixture for mounting on a support structure, such as a board, panel, counter, or the like, and the method for using the mounting fixture. More particularly, the invention pertains to a mounting fixture, a portion of which passes through a bore in a support structure and is secured against the inner surface of the structure, which allows the fixture to be mounted to the support structure, without the us of bolts, screws, or other fasteners on the outer surface of the structure. The invention is particularly useful where there is limited or no access to the inner surface of the structure for the placement of such fasteners. Once the fixture is mounted to the support structure, additional components may be attached to the mounting fixture. In one application, after the mounting fixture is secured to a counter, a sneeze guard support leg is attached to the top section of the mounting fixture, a pane of the sneeze guard may then be affixed to the support leg. In this application, typically two or more mounting fixtures with support legs attached would be used to affix and support opposing ends of the sneeze guard panes.

2. Description of the Prior Art

Various mounting devices and systems are used for mounting or securing an item to the surface of a structure. The simplest devices include fasteners such as nails, screws, and bolts. Other devices include various plates, brackets, and flanges, often used in conjunction with fasteners.

In the food service industry, sneeze guards are widely used as their use is frequently required by law. Although styles may vary, the typical sneeze guard has either a rigid frame, or two or more rigid and stationary support posts, and a fixed pane of glass or plastic material which provides the shield or barrier between the displayed food and the customers. Generally, the rigid frame or support posts of the sneeze guard are affixed to a support surface, such as a counter or table.

A simple form of mounting a sneezed guard is shown and described in U.S. Pat. No. 5,584,545, granted to La Vaute et al. Feet attached to the sneeze guard support legs provide three mounting holes. Two of the mounting holes are threadless, allowing for attachment by screws or other like fasteners. The third mounting hole is threaded for acceptance of a mounting bolt.

U.S. Pat. No. 4,892,366, issued to Yerman, shows a sneeze guard system having leg assemblies, each which include a base member to support the sneeze guard. Although the system is illustrated as free standing, the '366 patent discloses clamping to a table and socket mounting to a table.

Another common methods of mounting a sneeze guard to an outer surface of a structure, such as a counter top, is with a mounting flange affixed to the top surface. The flange is usually secured to the counter by screws or bolts. A sneeze guard support post is then secured to the flange.

Sneeze guard support posts may also be mounted using a flange on the inner surface of the counter, rather than on the outer surface thereof. The same types of flanges are used in this "under counter" mounting method as are used for outer surface mounting of a sneeze guard support post. The advantages of inner surface mounting include: aesthetic and sanitary considerations, in that no screws, bolts, or the like, are on or above the counter outer surface where they appear unsightly, and may collect dirt or food debris. Such mounting also has the advantage of added strength, in that a portion of the sneeze guard support post passes through a bore in the counter where the support post is secured from below the counter.

Although such "under counter" mounting has advantages, certain conditions prevent such mounting in many cases. Conditions which prevent, or make such mounting difficult, include wiring or plumbing considerations, and difficult or impossible access for an installer to secure the mounting device and/or the sneeze guard support post to the inner surface of the counter.

In contrast to the above-discussed prior art, it is an object herein to provide a mounting fixture which may be installed from above the outer surface of a support structure, such as a counter, without having to gain access to the underside of the structure.

It is a further object herein to provide a mounting fixture which is more aesthetically pleasing, with above counter components which are more easily cleaned than those described above.

It is yet a further object herein to provide a mounting fixture which enhances the strength of the mounting of additional components.

It is another object herein to provide a mounting fixture which allows electrical or plumbing lines to be passed through the support structure either from above the outer surface to below the inner surface, or from below the inner surface to above the outer surface.

SUMMARY OF THE INVENTION

The present invention provides a fixture for mounting on a support structure having an outer surface and an inner surface having a thickness therebetween, with a bore extending through said thickness, which mounting fixture comprises a tubular body, a retaining collar, a keeper body, and pivotable, rotatable ears. Each of these components is discussed below.

The tubular body has top section and a bottom section. The bottom section is right circular cylindrical, having external threads. The top section includes a plurality of flats for engagement by a wrench.

The retaining collar has an upper portion and a lower portion with an aperture passing through the center of the retaining collar. The upper portion is frusto conical and has a lower surface which is larger than the bore in the support structure to prevent the upper portion of the retaining collar from passing through the bore. The lower portion of the retaining collar is circular, with an outside diameter which is slightly smaller than the bore in the support structure. The lower portion internally threaded and the inside diameter of the lower portion is sized to be threaded onto the tubular body. The upper portion of the retaining collar has an inside diameter which is greater than the inside diameter of the lower portion, providing a ledge at the bottom of the inner surface of the upper portion. The inside diameter of the upper portion is also greater than the outside diameter of the tubular body; so that when the retaining collar is threaded onto the tubular body, an annular recess is created.

The keeper body has a threaded circular passageway passing therethrough. The diameter of the passageway is sized to be threaded onto the tubular body. The diameter of the upper part of the keeper body is slightly smaller than the diameter of the bore in the support structure. The diameter of the upper part of the keeper body is greater than the diameter of the lower part of the keeper body.

One or more pivotable, rotatable ears are mounted to the outside of the upper part of the keeper body. The ears are pivotable from a first closed position, wherein the diameter through the closed ears is no greater than the outer diameter of the lower portion of the retaining collar, to a second open position wherein the ears deploy away from the center axis of the passageway in the keeper body. The ears are provided with limit stops to them from opening too far. The ears are also provided with biting surfaces on the upper edges thereof.

In another embodiment of the invention, the mounting fixture further includes a sneeze guard support post which is attached to the top section of the tubular body. The tubular body is a right circular cylindrical tube, having external threads on the bottom section. The hollow portion of the tube is of sufficient size to allow the passage of electrical wire or water line therethrough. The retaining collar further includes a threaded hole extending through from the outer surface to the inner surface, and a set screw sized and configured to be placed within the threaded hole. The sneeze guard support post is a right circular cylindrical tube. The inside diameter of the support post is slightly larger than the outside diameter of the tubular body, and the outside diameter of the support post is slightly smaller than the inside diameter of the upper portion of the retaining collar. The lower end of the support post is in nesting relation with the ledge and inner surface of the retaining collar and is secured by the set screw.

The method for mounting the fixture on the support structure comprises steps described following. First, the retaining collar is threaded onto the tubular body with the second diameter of the retaining collar facing toward the top section of the tubular body. Second, the keeper body is threaded onto the tubular body with the ears facing toward the top section of the tubular body. The retaining collar and the keeper are threaded onto the tubular body to positions so that the distance between the lowest surface of the retaining collar and top most surface of the ears attached to the keeper, when the ears are in the closed position, is greater than the distance between the outer surface and an inner surface of the support structure around the area of the bore in such structure. With the ears in the closed position the tubular body, the keeper and the ears, and the lower portion of the retaining collar are passed through the bore in the support structure. The ears are deployed into an open position, the retaining collar is rotated into the desired position respective to the support structure surface, and the tubular body is rotated to draw the keeper against the inner surface of the support structure, securing the mounting fixture to the structure.

In the event the position of the mounting fixture needs to be adjusted, some adjustment may be made by changing the position of the retaining collar and the tubular body. The mounting fixture may be removed or replaced by completely unthreading the tubular body from the keeper, in which case the keeper will fall from the lower end of the tubular body. The keeper may then be retrieved and reused, or if unretrievable, may be replaced with a new keeper for reinstallation of the mounting fixture.

For some applications, the tubular body may be replaced with a solid post, having a right circular cylindrical shape, which is externally threaded on a bottom section thereof, and which includes a plurality of flats on the top section thereof. A solid post provides more strength, however a tube provides the added advantage of allowing electrical wire or conduit, plumbing or other lines to be passed through the hollow portion of the tube. Depending upon the application, the desired lines or tubes may be inserted in the hollow portion prior to, or after, installation of the mounting fixture in the support structure.

DETAILED DESCRIPTION OF THE PREFERRED EMBODIMENT

Figure 1:
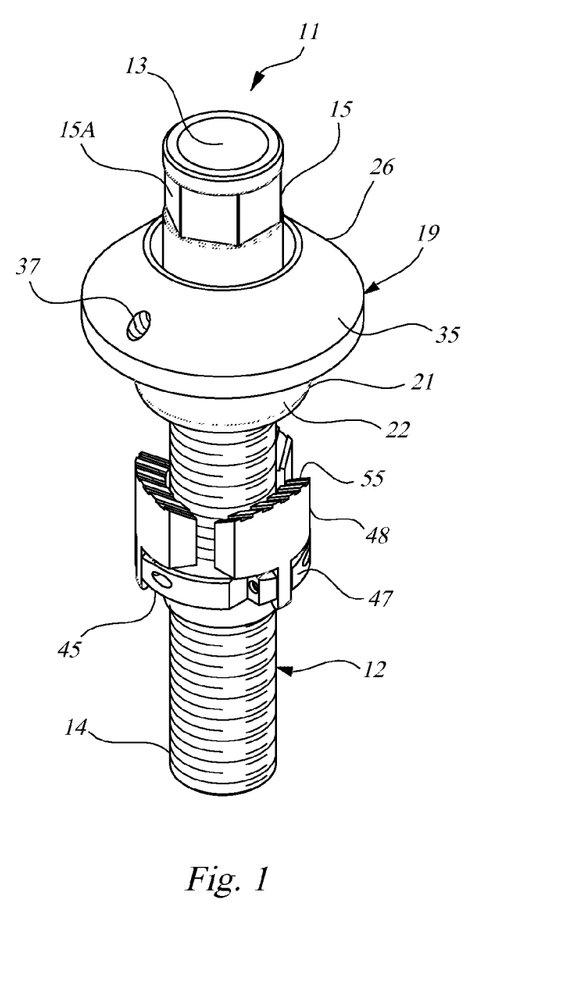
FIG. 1 is a perspective view (from above) of the mounting fixture with the ears, which are mounted to the keeper body, in the closed position.

Turning now to the drawings, FIG. 1 and show the mounting fixture 11 of the present invention, comprising fixture for mounting on a support structure 16. Support structure 16 has an outer surface 17 and an inner surface 18 having a thickness 20 therebetween. Thickness 20 is provided with a bore 38 therethrough. Fixture 11 includes a tubular body 12, a retaining collar 19, a keeper body 41, and pivotable, rotatable ears 48.

The tubular body 12 is aright circular cylindrical tube having a hollow center 13. The tubular body 12 has a bottom section 14 which is externally threaded, and a top section 15. The top section 15 further includes a plurality of flats 15A, for engagement of the top section 15 by a wrench to tighten or loosen fixture 11. The top section 15 and bottom section 14 of the tubular body are most clearly seen in FIG. 5. It will be appreciated that alternatives to the plurality of flats 15A exist to tighten or loosen the fixture 11, such as providing a hole or a slot transversely through said top section 15 for engagement by a screwdriver or another tool as a handle, or providing internal facets forming a socket inside the hollow center 13.

The hollow center 13 provides a passage way for electrical wires, plumbing lines, or the like, to be passed through the support structure 16 either from above the outer surface 17 to below the inner surface 18, or from below the inner surface 18 to above the outer surface 17.

In alternative configurations, the top section 15 of tubular body 12 may be sized and shaped differently than the bottom section 14. Furthermore, it may be desirable in some applications that the tubular body 12 be a solid post rather than a hollow tube.

Figure 6:
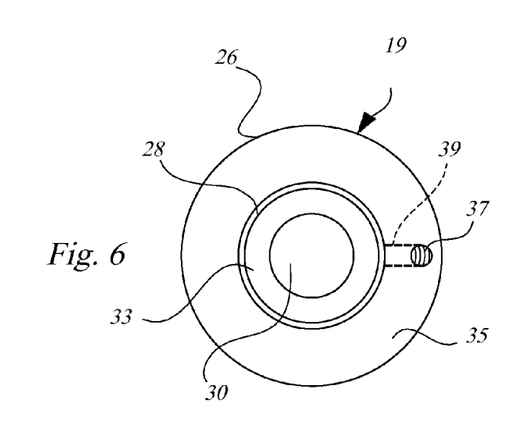
FIG. 6 is a top plan view of the retaining collar.
Figure 6A:
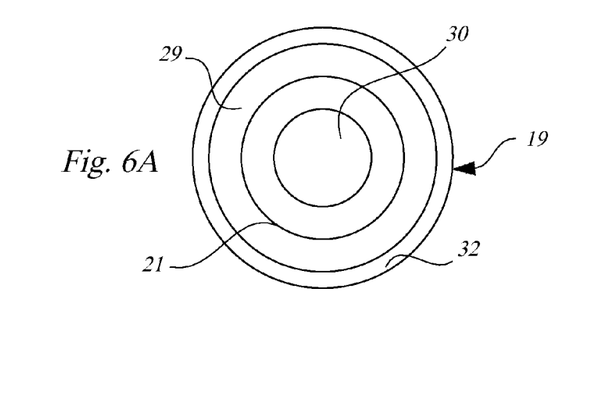
FIG. 6A is a bottom plan view of the retaining collar.
Figures 7, 7A:
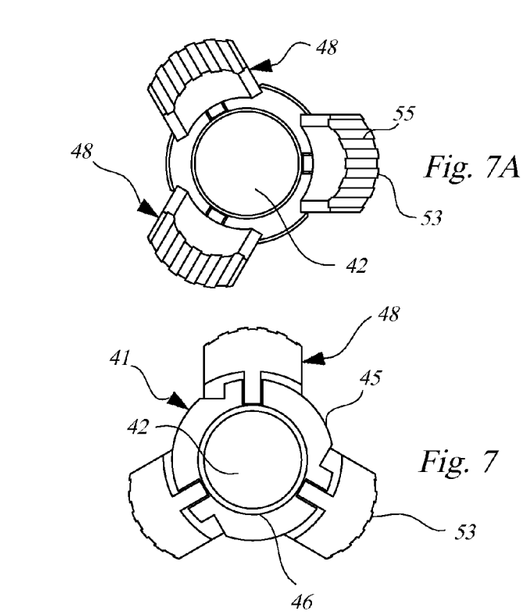
FIG. 7 is a top plan view of the keeper body with the ears in the open position.
FIG. 7A is a bottom plan view of the keeper body with the ears in the open position.

The retaining collar 19 has a circular lower portion 21 an upper portion 26, with an aperture 30 through the center of said retaining collar 19, as shown in FIGS. 6 and 6A.

The upper portion 26 of retaining collar 19 is frustoconical having an inside diameter greater than the outside diameter of the tubular body 12, said upper portion 26 further having an outside surface 35 and an inside surface 36. The upper portion 26 of the retaining collar 19 has an upper edge 28 and a lower outside edge 31 (see FIGS. 2 and 5).

Figure 2:
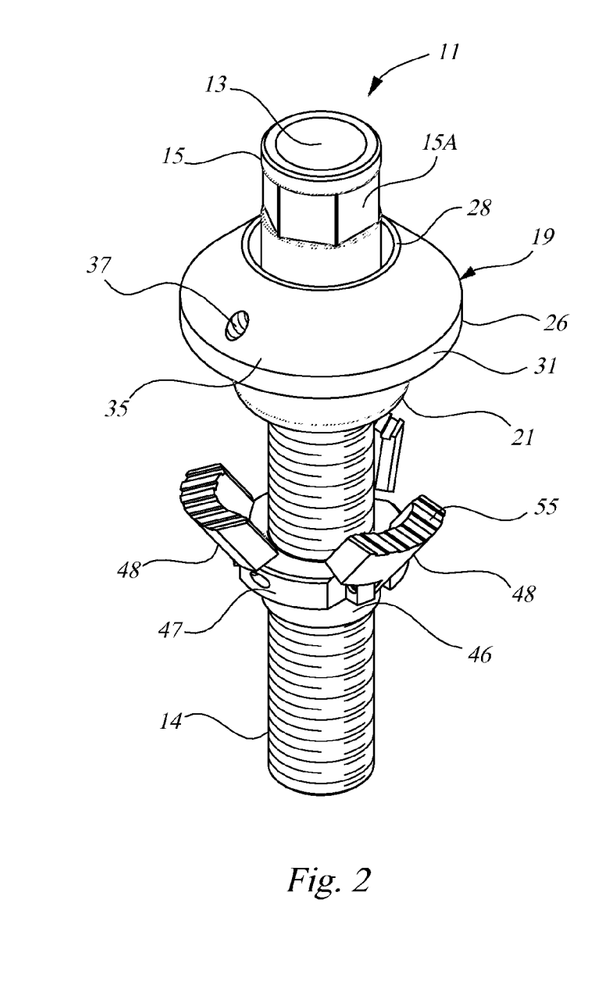
FIG. 2 is a perspective view (from above) of the mounting fixture with the ears, which are mounted to the keeper body, in the open position.
Figure 3:
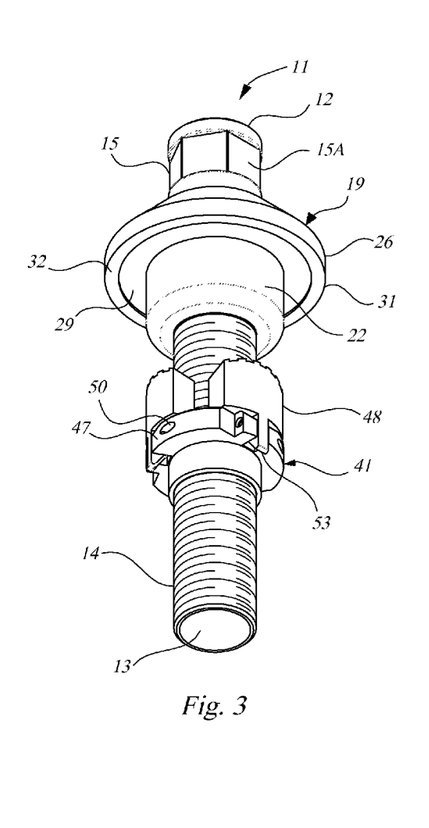
FIG. 3 is a perspective view (from below) of the mounting fixture with the ears, which are mounted to the keeper body, in the closed position.
Figure 10:
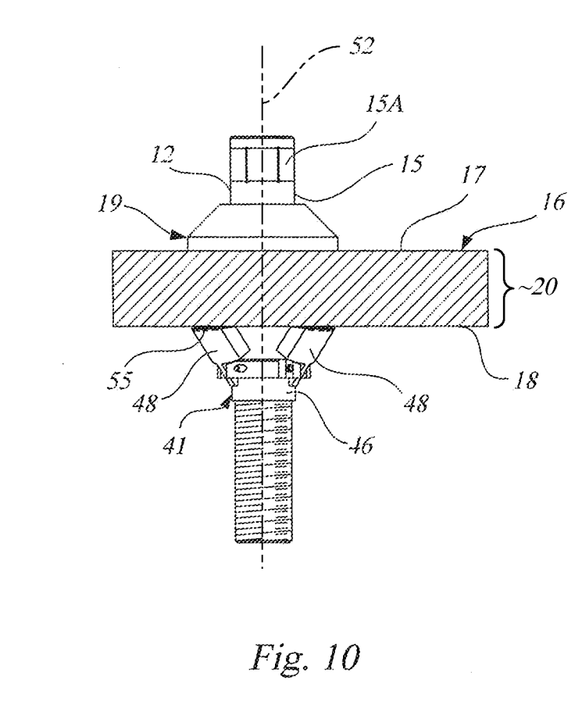

The upper portion 26 of retaining collar 19 has a partial lower surface 29 as seen in FIGS. 2 and 3. The lower surface 29 of the upper portion 26 is sized to extend beyond bore 38 and to be adjacent to outer surface 17 when fixture 11 is installed in support structure 16 as shown in FIG. 10.

Figure 4:
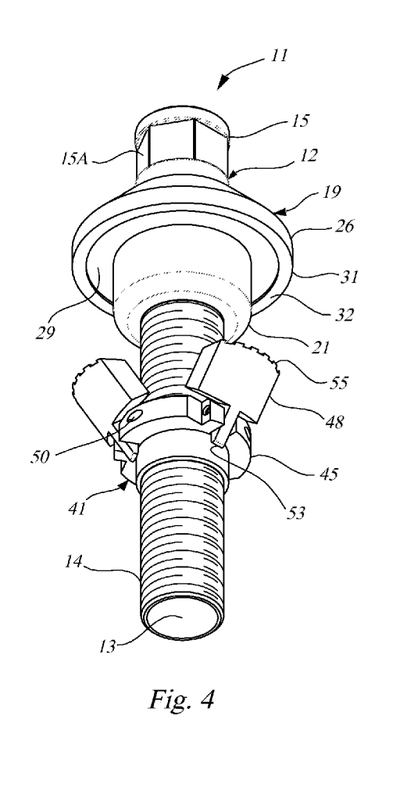
FIG. 4 is a perspective view (from below) of the mounting fixture with the ears, which are mounted to the keeper body, in the open position.

The lower surface 29 of the upper portion 26 further includes a lip 32 as shown in FIGS. 3, 4, and 6A. It will be understood that a gasket (not shown) may be placed against said lower surface 29 inside lip 32, if a tight seal is desired between the lower surface 29 of retaining collar 19 and the outer surface 17 of support structure 16.

The lower portion 21 of retaining collar 19 has an outside surface 22 with a diameter slightly smaller than the diameter of bore 38 in support structure 16. The outer portion 21 has an internally threaded inner surface 24, the diameter of said internally threaded inner surface 24 sized to be threaded onto the bottom section 14 of tubular body 12.

As the inside diameter of the upper portion 26 of retaining collar 19 is greater than the diameter internally threaded inner surface 24 of the lower portion 21, a ledge 33 is formed internally at the interface of said upper portion 21 and said lower portion 26.

The upper portion 26 of retaining collar 19 further includes at least one threaded hole 37 passing from the outside surface 35 to the inside surface 36 as shown by phantom lines 39 in FIG. 6. The retaining collar 19 further includes at least one set screw sized and configured to be placed within the threaded hole 37. The set screw may be used to secure additional components in nesting relation with the inside surface 36 of the upper portion 26 of retaining collar 19, the ledge 33, and the top section 15 of tubular body 12. Shapes alternative to frustoconical exist for the outside surface 35 of retaining collar 19, including, by way of example, cylindrical or pyramidal.

Figure 5:
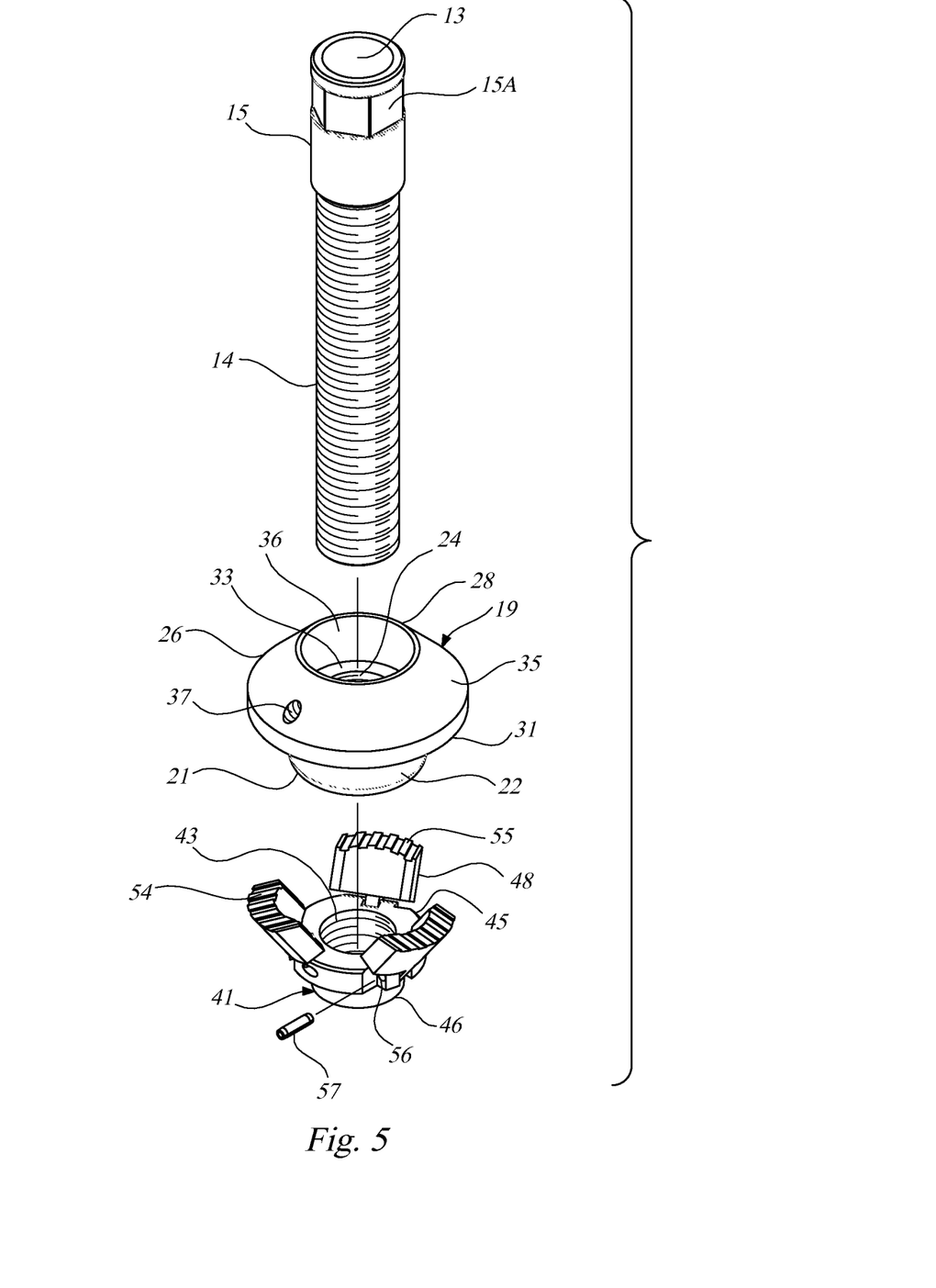
FIG. 5 is an exploded perspective view of the invention, showing the tubular body, retaining collar, and keeper body with the ears in the open position.

The keeper body 41 has a circular passageway 42 with an internally threaded surface 43 as seen in FIG. 5. The diameter of said passageway 42 is sized to be threaded onto said bottom section 14 of the tubular body 12.

The keeper body 41 includes ring-shaped upper part 45 and a lower part 46 as best seen in FIGS. 3 and 4.

The upper part 45 of keeper body 41 has an outside 47 and an outer diameter slightly smaller than the diameter of the bore 38 in support structure 16. The lower part 46 has a smaller diameter than said upper part 45 of the keeper body.

The upper part 45 of the keeper body 41 further includes three (3) equally spaced cutouts in the outside 47, with a hole 56 extending from a first point on the outside 47 to a second point on the outside 47, through the cutout section and terminating at aperture 50 in the outside 47.

Fixture 11 further includes three (3) equally spaced pivotable, rotatable ears 48 attached at the points of the cutouts in the upper part 45 of keeper body 41. The ears 48 are pivotable from a first closed position as shown to FIGS. 1 and 3, to a second open position wherein said ears 48 deploy away from the center axis 52 (shown in FIG. 10 in phantom line) of the circular passageway 42 in keeper body 41.

The diameter taken across the ears 48 when they are in the closed position is no greater than said outside diameter of the lower portion 21 of retaining collar 19.

The ears 48 have a lower end 53 and an upper edge 54. The lower end 53 is a pivot arm with an inside taper as seen in FIG. 3. The lower end 53 acts as a limit stop when said lower end 53 rests against the surface of lower part 46 of keeper body 41 when said ears 48 are deployed into the open position as shown in FIG. 4. Lower end 53 includes a hole positioned to line up with hole 56 and aperture 50 in upper part 45 of the keeper body 41.

Figure 11:
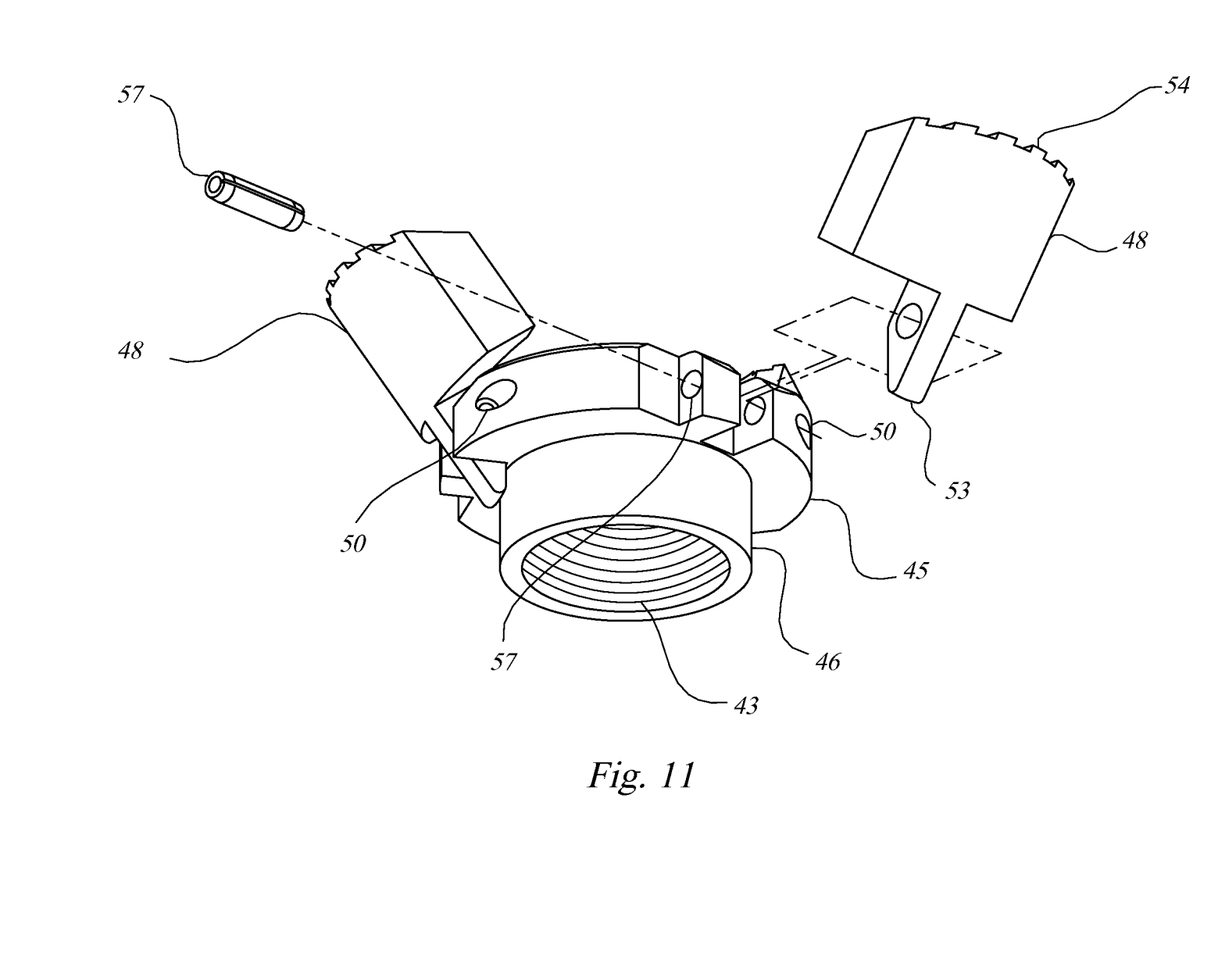
FIG. 11 is a partially exploded perspective view (from below), taken to an enlarged scale, showing the detail of the attachment of the ears to the upper part of the keeper body.

The lower end 53 of the ears 48 are attached to the upper part 45 of the keeper body by means of a spring pin 57 passing through hole 56 and the hole in lower end 53 and into aperture 50. These attachment features of the ears 48 to the upper part 45 of the keeper body 41 are best seen in FIG. 11.

The upper edges 54 of ears 48 include biting surfaces 55 to help prevent slippage when said upper edges 54 are secured against the inner surface 18 of support surface 16. There are many biting surfaces 55 which may be used for this purpose depending on the material of the inner surface 18. By way of example, such biting surfaces 55 include a plurality of grooves, teeth, and nubs, as well as rubberized coatings or material applied or affixed to the upper edges 54 of ears 48.

In another embodiment of the invention, the mounting fixture 11 further includes a sneeze guard support post 61 (shown partially in phantom lines in FIG. 9 to aid in seeing the details of to section 15 of tubular body 12) which is attached to the top section of the tubular body 12. The tubular body 12, the retaining collar 19, the keeper body 41 and the ears 48 are as described above. The sneeze guard support post 61 is a right circular cylindrical tube having a lower end 62, the inside diameter of which is slightly larger than the outside diameter of the tubular body 12, and the outside diameter of the support post 61 is slightly smaller than the inside diameter of the upper portion 26 of the retaining collar 19. When assembled, the lower end 62 of the support post 61 is in nesting relation with the inside surface 36 of the upper portion 26 of retaining collar 19, the ledge 33, and the top section 15 of tubular body 12, and is secured by the set screw 63 through threaded hole 37, which set screw 63 constitutes means for attaching sneeze guard support post 61 to top section 15 of tubular body 12.

The order of assembly of the mounting fixture 11 from FIG. 5. The retaining collar 19 is threaded onto the bottom section 14 of tubular body 12 to a point adjacent the top section 15 of the tubular body 12, then the keeper body 41 with ears 48 is threaded onto the bottom section 14 of the tubular body 12 to a point wherein the distance between the lower surface of the retaining collar 19 and the upper edge of said ears 48 in the closed position is greater than the thickness 20 of support structure 16. This final positioning is shown in FIG. 8.

Figure 8:
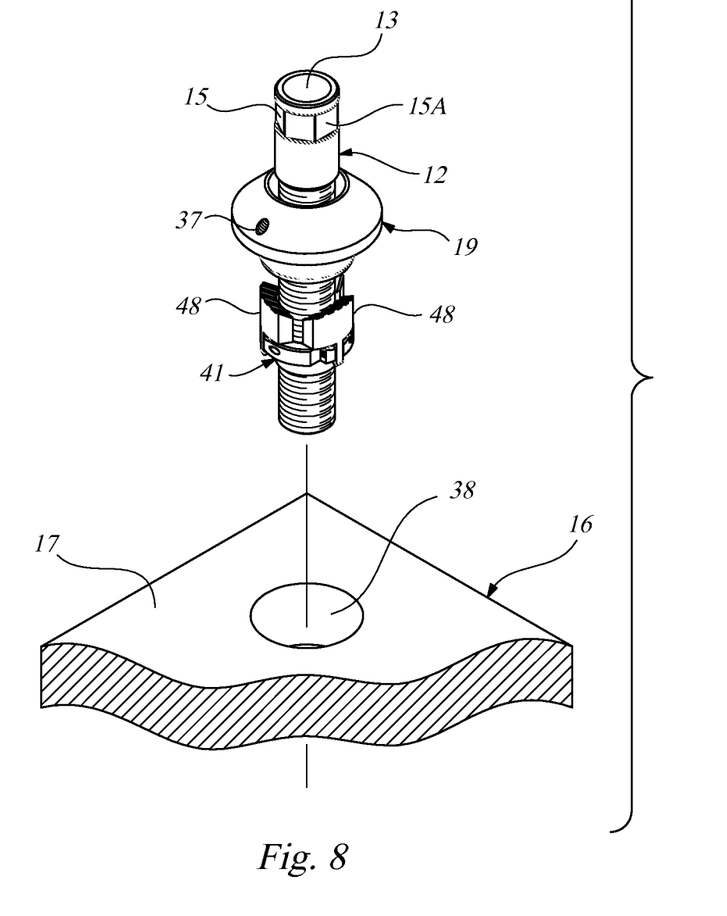
FIG. 8 is a perspective view (from above) of the mounting fixture positioned to be installed through the bore in a support structure (shown cut away), with the ears of the keeper body in the closed position.
Figure 9:
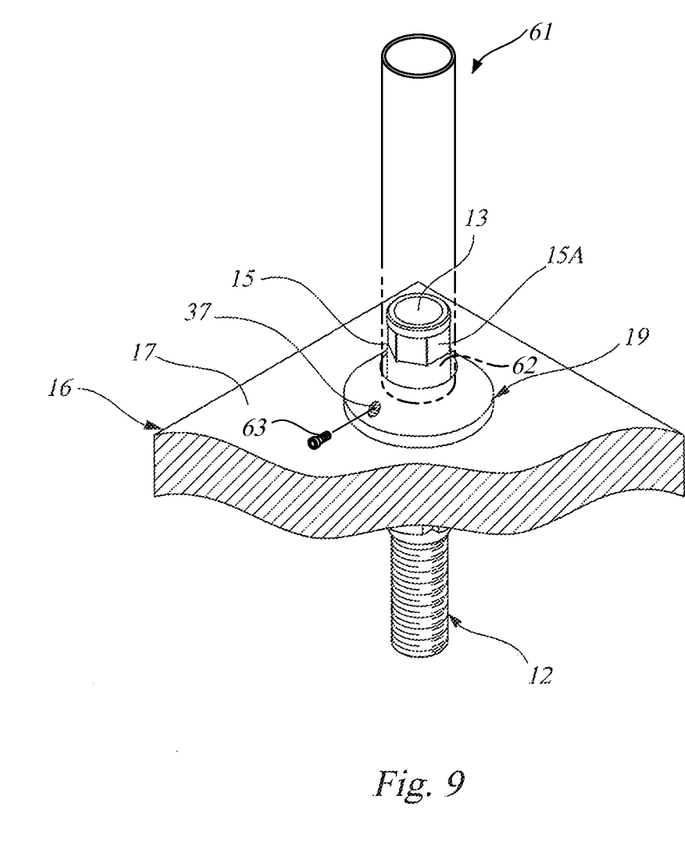
FIG. 9 is a perspective view (from above) of the mounting fixture installed through the bore in a support structure (shown cut away); and, FIG. 10 is an elevational view of the mounting fixture installed in a support structure, showing the retaining collar secured against the outer surface of the support structure, and the ears of the keeper body deployed in the open position with the biting surfaces of the ears engaging the inner surface of the support structure.

The method of using the mounting fixture 11 is illustrated in FIGS. 8, 9 and 10. FIG. 8 shows the mounting fixture 11 positioned directly over the outer surface 17 and bore 18 in the support structure 16, with the ears 48 in the closed position. Turning to FIG. 9, it can be seen that a portion of the bottom section 14 of the tubular body 12 has passed through the bore 38 in support structure 16, the lower surface 29 of the upper portion 26 of retaining collar 19 is adjacent the outer surface 17 of the support structure 16. In FIG. 10, ears 48 have been deployed into the open position, and the top section 15 of tubular body 12 has been rotated by means of engaging the plurality of flats 15A, drawing the upper edges 54 and biting surfaces 55 tightly against the inner surface 18 of the support structure 16.

Once installed in the support structure 16, additional components, such as a sneeze guard support leg may be attached as described above. Additional embodiments exist for which the descriptive language might be changed due to spacial orientation. Although shown in the preferred embodiment as mounted on the outer surface of a horizontal structure, such as a counter, table or ceiling, the mounting fixture disclosed herein could be used in a vertical orientation, such as on a wall.

What is claimed is:

1. A fixture for mounting on a support structure having an outer surface and an inner surface, the outer and inner surfaces having a thickness therebetween, with a bore extending through said thickness, comprising:
   a. a tubular body, said tubular body having a top section and a bottom section, said bottom section being a right circular cylindrical, and having external threads;
   b. a retaining collar, said retaining collar having an upper portion and a circular lower portion with an aperture through the center of said retaining collar; said upper portion having a lower surface larger than the bore in the support structure; and, said lower portion having an outside diameter slightly smaller than the diameter of the bore in the support structure, and further having internal threads, the diameter of said internally threaded lower portion sized to be threaded onto said bottom section of said tubular body; and,
   c. a keeper body, said keeper body having an internally threaded circular passageway, the diameter of said passageway sized to be threaded onto said bottom section of the tubular body, said keeper body including an upper part having an outside diameter slightly smaller than the diameter of the bore in the support structure, and a lower part having a smaller diameter than said upper part; said keeper body further including one or more pivotable, rotatable ears mounted to the outside of said upper part of the keeper body, said ears being pivotable from a first closed position wherein the diameter through said ears in said closed position is no greater than said outside diameter of said lower portion of said retaining collar, to a second open position wherein said ears deploy away from the center axis of said passageway in the keeper body, each of said ears further including at least one limit stop, whereby said retaining collar and said keeper body are threaded onto said tubular body, said bottom section of the tubular body, the keeper body with the ears in the closed position, and the lower portion of the retaining collar are passed through the bore in the support structure, the ears are deployed into the open position, and said ears are secured against the inner surface of said support structure.

2. The fixture of claim 1 in which said tubular body further includes a plurality of flats on said top section.

3. The fixture of claim 1 in which said aperture through the center of said upper portion of the retaining collar is internally threaded, the diameter of said internally threaded upper portion sized to be threaded onto said bottom section of said tubular body.

4. The fixture of claim 1 in which the inner diameter said upper portion of the retaining collar is greater than the inner diameter of said lower portion of the retaining collar.

5. The fixture of claim 1 in which said ears include an upper edge having a biting surface.

6. The fixture of claim 5 in which said biting surface comprises a plurality of grooves.

7. The fixture of claim 5 in which said biting surface comprises a rubberized material affixed to said upper edge of said ear.

8. The fixture of claim 1 in which said ears deploy to approximately 45 degrees from the center axis of said passageway in the keeper body.

9. The fixture of claim 1 in which said tubular body comprises a right circular cylindrical tube further having a hollow portion therethrough.

10. The fixture of claim 1 in which said tubular body comprises a right circular cylindrical post.

11. A fixture for mounting on a support structure having an outer surface and an inner surface, the outer and inner surfaces having a thickness therebetween, with a bore extending through said thickness, comprising:
   a. a tubular body, said tubular body comprises a right circular cylindrical tube, having a top section and a bottom section, said bottom section being externally threaded;
   b. a retaining collar, said retaining collar having an upper portion and a circular lower portion with an aperture through the center of said retaining collar; said upper portion is frustoconical having an inside diameter greater than the outside diameter of the tubular body, said upper portion further having an inside surface and an outside surface, and further having a partial lower surface sized to extend beyond the bore in the support structure; and, said lower portion having an outside diameter slightly smaller than the diameter of the bore in the support structure, and further having internal threads, the diameter of said internally threaded lower portion sized to be threaded onto said bottom section of said tubular body; and, a ledge at the interface of said upper portion and said lower portion; and,
   c. a keeper body, said keeper body having an internally threaded circular passageway, the diameter of said passageway sized to be threaded onto said bottom section of the tubular body, said keeper body including a ring-shaped upper part having an outside surface and an outside diameter slightly smaller than the diameter of the bore in the support structure, and a lower part having a smaller diameter than said upper part; said keeper body further including at least one hole extending from a first point on the outside surface of said upper part to a second point on the outside surface of said upper part and further including a cut out between said first point and said second point;
   d. one or more pivotable, rotatable ears having an upper edge and a lower end, said lower end providing a stop, said lower end of said ears being mounted to the outside of said upper part of the keeper body between said first point and said second point by means of a pin through said hole in said keeper body, said ears being pivotable from a first closed position wherein the diameter through said ears in said closed position is no greater than said outside diameter of said lower portion of said retaining collar, to a second open position wherein said ears deploy away from the center axis of said passageway in the keeper body;
   e. a sneeze guard support post, said sneeze guard support post comprises a right circular cylindrical tube having an upper end and a lower end, and further having an inside diameter slightly larger than the outside diameter of said tubular body and an outside diameter slightly smaller than the inside diameter of said upper portion of the retaining collar; and, f. means for attaching said sneeze guard support post to said top section of the tubular body, whereby said retaining collar and said keeper body are threaded onto said tubular body, said bottom section of the tubular body, the keeper body with the ears in the closed position, and the lower portion of the retaining collar are passed through the bore in the support structure, the ears are deployed into the open position, said ears are secured against the inner surface of said support structure, and said sneeze guard support post is attached to said top section of the tubular body.

12. The fixture of claim 11 in which said lower end of said sneeze guard post is in nesting relation with said inside surface of said upper portion of the retaining collar, said ledge, and said top section of the tubular body.

13. The fixture of claim 12 in which said upper portion of the retaining collar further includes at least one threaded hole passing from the outside surface to the inside surface and at least one set screw sized and configured to be placed within said threaded hole.

14. The fixture of claim 11 in which said pin comprises a spring pin.

15. The fixture of claim 11 in which said upper edges of said ears include a biting surface.

16. The fixture of claim 15 in which said biting surface comprises a plurality of grooves.

17. The fixture of claim 15 in which said biting surface comprises a rubberized material affixed to said upper edges of said ears.

18. A method for mounting a fixture on a support structure comprising the steps of:

a. providing a support structure having an outer surface and an inner surface, said outer and inner surfaces having a thickness therebetween;

b. providing a bore through said thickness;

c. providing a tubular body, said tubular body having a top section and a bottom section, said bottom section being a right circular cylindrical and having external threads;

d. providing a retaining collar, said retaining collar having an upper portion and a circular lower portion with an aperture through the center of said retaining collar; said upper portion is frustoconical having an inside diameter greater than the outside diameter of the tubular body, said upper portion having an inside surface and an outside surface, and further having a lower surface larger than the bore in the support structure; and, said lower portion having an outside diameter slightly smaller than the diameter of the bore in the support structure, and further having internal threads, the diameter of said internally threaded lower portion sized to be threaded onto said bottom section of said tubular body; and, a ledge at the interface of said upper portion and said lower portion;

e. threading said retaining collar onto said bottom section of the tubular body to a point adjacent said top section of the tubular body;

f. providing a keeper body, said keeper body having an internally threaded circular passageway, the diameter of said passageway sized to be threaded onto said bottom section of the tubular body, said keeper body including a ring-shaped upper part having an outside surface and an outside diameter slightly smaller than the diameter of the bore in the support structure, and a lower part having a smaller diameter than said upper part; said keeper body further including at least one hole extending from a first point on the outside surface of said upper part to second point on the outside surface of said upper part and further including a cutout between said first point and said second point;

g. providing one or more pivotable, rotatable ears, said ears having an upper edge and a lower end, said lower end providing a stop, said lower end of said ears being mounted to the outside of said upper part of the keeper body between said first point and said second point by means of a pin through said hole in said keeper body, said ears being pivotable from a first closed position wherein the diameter through said ears in said closed position is no greater than said outside diameter of said lower portion of said retaining collar, to a second open position wherein said ears deploy away from the center axis of said passageway in the keeper body; and, said ears further having a biting surface on said upper edge;

h. threading said keeper body onto said bottom section of the tubular body to a point wherein the distance between the lower surface of said retaining collar and the upper edge of said ears in the closed position is greater than the thickness of said support structure;

i. with said ears in the closed position, passing a portion of said bottom section of the tubular body, the keeper body and the ears, and the lower portion of the retaining collar through said bore in the support structure to a point where the lower surface of the upper portion of said retaining collar is adjacent to the outer surface of said support structure;

j. deploying said ears into an open position; and, k. rotating said tubular body to draw said upper edges of said ears of the keeper body tightly against the inner surface of the support structure.

19. A method as in claim 18 in which said method further includes the steps providing a sneeze guard support post comprising a right circular cylindrical tube having an upper end and a lower end, and further having an inside diameter slightly larger than the outside diameter of said tubular body and an outside diameter slightly smaller than the inside diameter of said upper portion of the retaining collar, and placing said lower end of said sneeze guard support post over said top section of the tubular body so that said lower end of said sneeze guard post is in nesting relation with said inside surface of said upper portion of the retaining collar, said ledge, and said top section of the tubular body.

20. A method as in claim 19 in which said method further includes the steps of providing said upper portion of the retaining collar with a threaded hole passing from the outside surface to the inside surface, further providing a set screw, and securing the set screw through the threaded hole against the said sneeze guard post.

* * * * *